United States Patent [19]

Fitzgerald et al.

[11] 3,875,791

[45] Apr. 8, 1975

[54] VARIABLE SHEAR RATE, WIDE DYNAMIC RANGE TRUE INDICATING VISCOMETER

[75] Inventors: John Vincent Fitzgerald, Metuchen; Frank J. Matusik, Piscataway; Raymond M. Dallenbach, Trenton, all of N.J.

[73] Assignee: National Metal and Refining Company, Inc., Edison, N.J.

[22] Filed: Aug. 21, 1974

[21] Appl. No.: 499,320

[52] U.S. Cl. .................................................. 73/59
[51] Int. Cl. .......................................... G01n 11/16
[58] Field of Search .............................. 73/59, 54

[56] References Cited
UNITED STATES PATENTS

| | | | |
|---|---|---|---|
| 2,485,424 | 10/1949 | Weisz | 73/59 |
| 2,572,693 | 10/1951 | Boyle | 73/59 |
| 2,679,157 | 5/1954 | Carpenter | 73/59 |
| 3,316,754 | 5/1967 | Nagatsuka et al. | 73/59 |
| 3,343,405 | 9/1967 | Gilinson, Jr. et al. | 73/59 |
| 3,710,614 | 1/1973 | Oppliger | 73/59 |
| 3,712,117 | 1/1973 | Fitzgerald et al. | 73/59 |
| 3,722,262 | 3/1973 | Gilinson, Jr. et al. | 73/59 |

FOREIGN PATENTS OR APPLICATIONS

| | | | |
|---|---|---|---|
| 200,309 | 9/1967 | U.S.S.R. | 73/59 |

Primary Examiner—Herbert Goldstein
Assistant Examiner—Joseph W. Roskos
Attorney, Agent, or Firm—Arthur L. Lessler

[57] ABSTRACT

A viscosity measuring system of the rotational viscometer type, in which a spindle is secured to one end of a shaft the other end of which is rigidly attached to a drive motor. A precision electronic control system maintains the angular speed of rotation of the motor, shaft and spindle at a desired value, which may be varied manually or automatically over a wide range of speeds. When the spindle is immersed in liquid whose viscosity is to be determined, the electronic control system supplies sufficient drive current to the motor to overcome the viscous torque exerted on the spindle by the liquid, plus a residual current to overcome friction, windage and other losses not associated with the liquid. A sensing circuit provides an output signal proportional to the motor current, and a compensation circuit subtracts from this output signal a value corresponding to the residual current, the resulting signal corresponding to the viscous torque. A permanent magnet DC motor having a non-magnetic core is employed, so that the aforementioned resulting signal varies linearly with viscous torque, and therefore is directly proportional to the viscosity of the liquid at the angular speed at which the shaft is rotated. A dividing circuit provides an output voltage to a display or recording instrument corresponding to the ratio of viscous torque to angular shaft speed. For Newtonian liquids this ratio is independent of speed and provides a true indication of liquid viscosity at any desired speed. The Newtonian or non-Newtonian character of a liquid can be easily and rapidly determined merely by varying the motor speed setting and observing whether there is any change in the true viscosity reading of the display or recording instrument.

26 Claims, 7 Drawing Figures

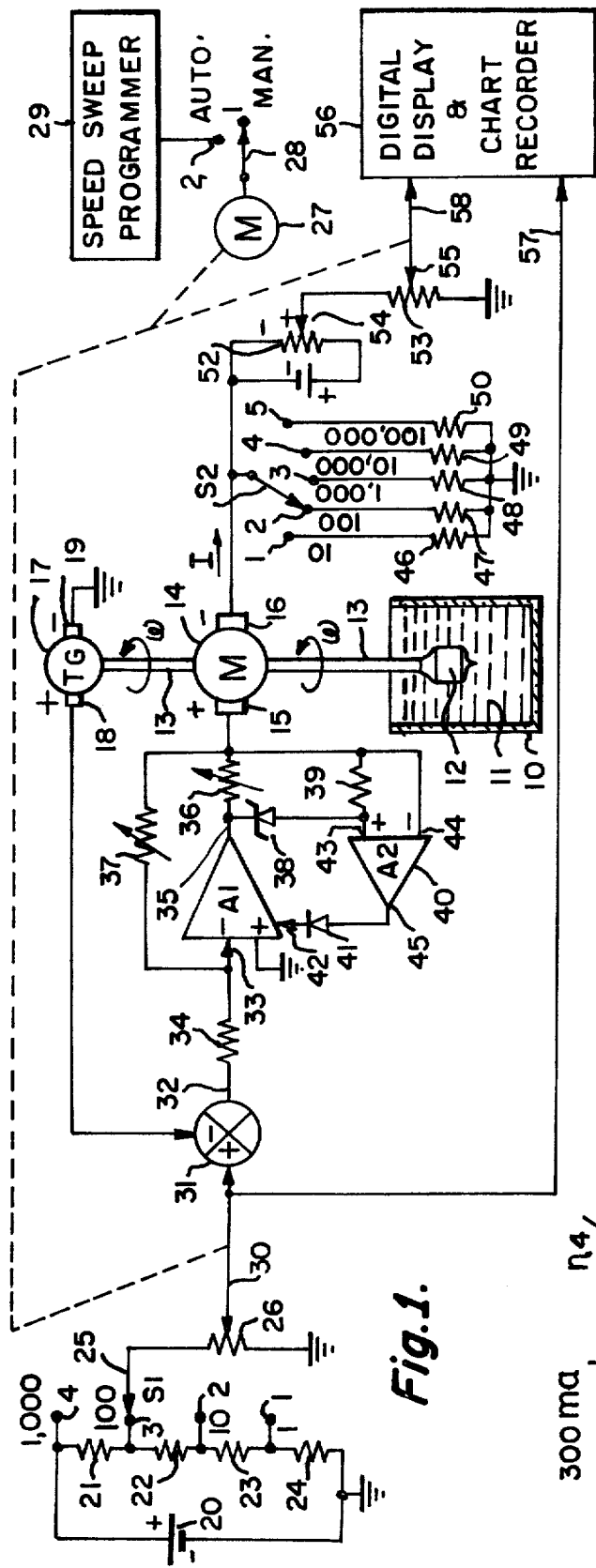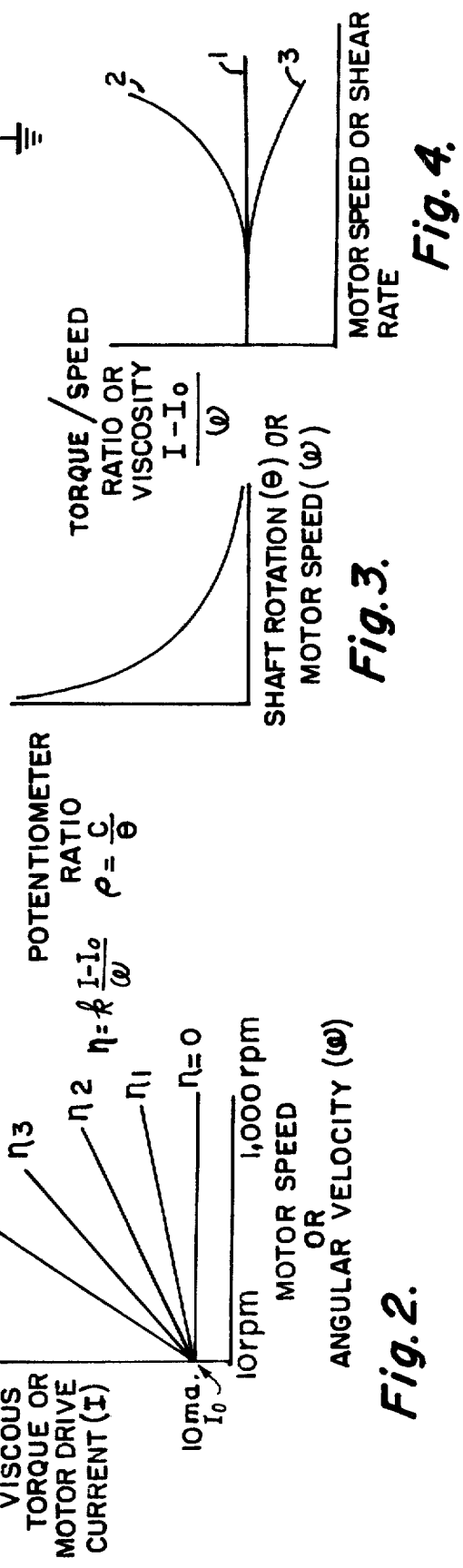

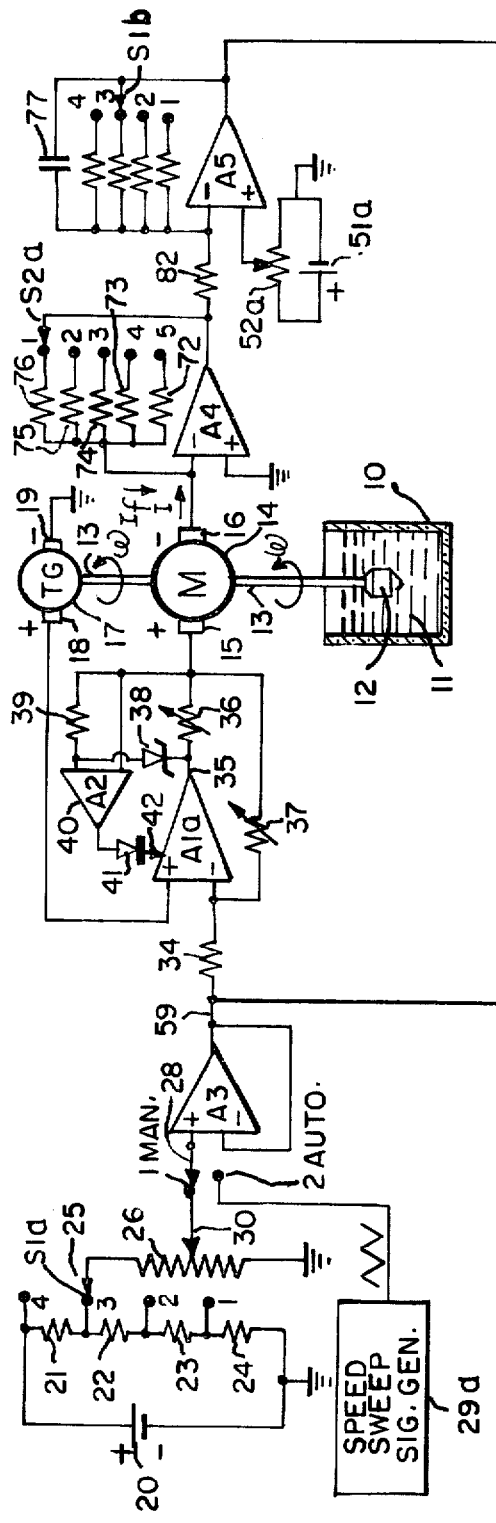
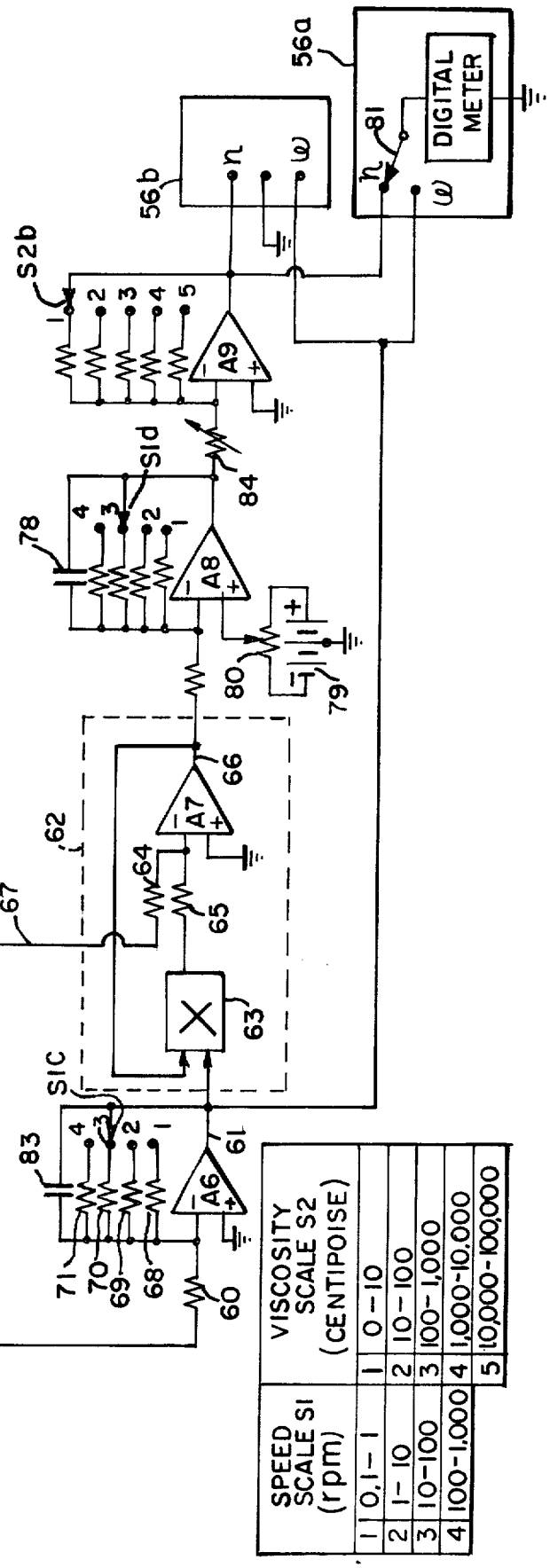
Fig.5.
| SPEED SCALE S1 (rpm) | | VISCOSITY SCALE S2 (CENTIPOISE) | |
|---|---|---|---|
| 1 | 0.1–1 | 1 | 0–10 |
| 2 | 1–10 | 2 | 10–100 |
| 3 | 10–100 | 3 | 100–1,000 |
| 4 | 100–1,000 | 4 | 1,000–10,000 |
| | | 5 | 10,000–100,000 |

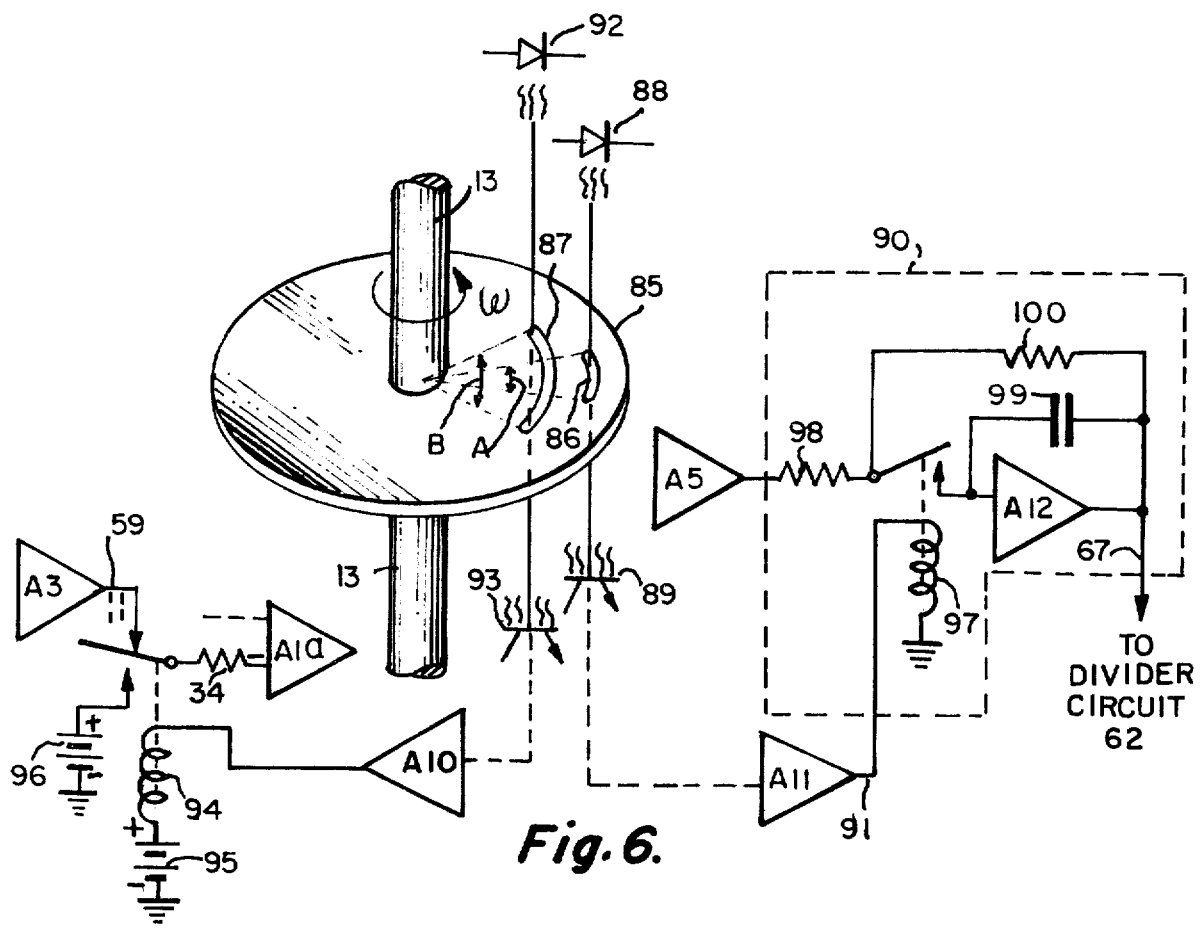
Fig. 6.
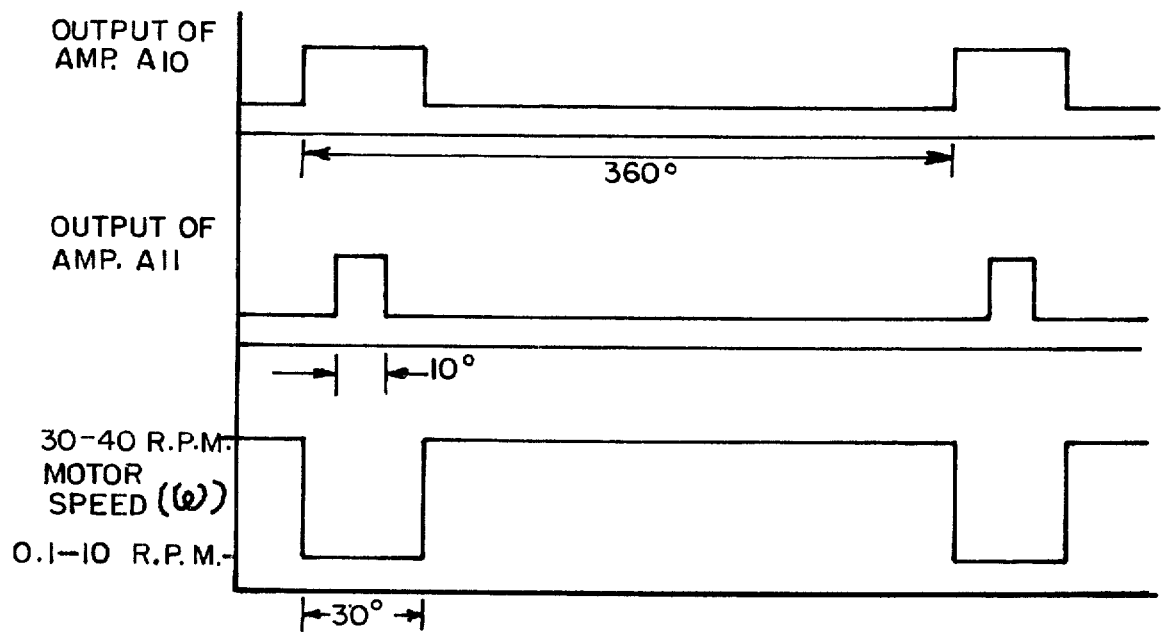
Fig. 7. ANGULAR POSITION OF SHAFT 13

VARIABLE SHEAR RATE, WIDE DYNAMIC RANGE TRUE INDICATING VISCOMETER

This invention relates to apparatus of the rotational viscometer type for measuring the viscosity of a liquid medium.

Many industrial processes require the measurement of liquid viscosities on a repetitive or continuous basis. In many of these processes it is highly advantageous to provide a display of liquid viscosity at a point remote from the location of the liquid sample whose viscosity is to be monitored.

An important area of utilization of such viscosity measurement systems is that of pollution control. One of the means by which pollution of streams and lakes due to discharge of industrial wastes and sewage can be reduced is the dilution of such discharges to a sufficiently low viscosity so that they are dissipated in the streams or lakes into which they feed. In order to accomplish such dilution on an automated basis, a viscosity measurement system which provides remote monitoring of viscosity changes on a continuous basis is required.

In addition to pollution control applications, high precision viscosity measurement systems can contribute to the nation's energy conservation effort. In order to provide minimal air pollution and efficient utilization of gasoline, it is necessary for manufacturers of automobile carburetors to adjust the fuel systems thereof to extremely close tolerances in order to insure that combustion occurs with maximum efficiency consistent with minimum pollution of the air by noxious exhaust products. In order to adjust carburetor fuel systems to such precise tolerances, so that the fuel is delivered uniformly and at exactly the required rate, it is essential that the carburetor be adjusted at the factory under conditions where it is supplied with fuel blended to a precisely controlled viscosity. The critical nature of this carburetor adjustment process is evidenced by the small size of the metering jets through which the fuel passes, with the result that small variations in gasoline viscosity result in significant changes in the fuel delivery rate. Similarly, in the manufacture of gasoline it is highly desirable to monitor the viscosity of the fuel during the manufacturing process, to ensure final viscosity values consistent with those which are employed by automobile manufacturers in the adjustment of carburetors.

In large diesel engines, optimum combustion efficiency may be realized by automatically and continuously controlling the viscosity of the fuel oil utilized, to provide optimum viscosity of the oil injected into the diesel engine cylinders. This adjustment of viscosity can be accomplished by controlling the temperature of the fuel oil, and/or by blending oils of relatively high and relatively low viscosities in automatically controlled proportions to provide the desired optimum injection viscosity. Such automatic control of fuel oil viscosity is particularly desirable in the operation of diesel engines on ships, where the effective operating range of the ship is dependent upon the efficiency with which its diesel engines are operated.

Among the many known techniques for the measurement of liquid viscosity, those which rely upon the interaction of an electrically driven member with the liquid medium whose viscosity is to be determined have proven to be of greatest interest from the point of view of providing remote monitoring capability as well as sufficient versatility to be useful for liquids having widely varying viscosities. A large number of viscosity measuring techniques are described in (i) Chapter VII of "Frictional Phenomena" by Andrew Gemant, Chemical Publishing Company, Inc., Brooklyn, N.Y. U.S.A. 1950; and (ii) "Viscosity and Flow Measurements" by Van Waser, Lyons, Kim and Colwell, Interscience Publishers, a division of John Wiley & Sons, N.Y. 1963.

Of the various electrical excitation techniques for measuring fluid viscosity, those based on the rotational viscometer have received the greatest attention and development effort. In the most popular variety of rotational viscometer, a spindle is attached to one end of a shaft, the other end of which is driven by an electric motor. A compliant element between the spindle and the motor armature or rotor is twisted by the viscous drag exerted upon the spindle by the liquid whose viscosity is to be determined. The compliant element may be a spring (the most popular type of element), or alternatively the shaft itself may be sufficiently compliant to experience torsion due to the viscous force. The resulting angular deflection of the spring or other compliant element is measured by a sensitive mechanical, optical or electrical transducer. This transducer must necessarily be situated adjacent to the liquid whose viscosity is being measured, and must be subjected to continuous rotation. Where hot, corrosive or poisonous liquids are involved, it is difficult and expensive to provide a transducer which is of sufficient sensitivity while being resistant to the liquid which may be splattered onto the transducer or whose vapors may come in contact with it. It is also difficult and expensive to provide coupling of signals from the rotating transducer in cases where for one of the aforementioned reasons or to prevent contamination thereof the liquid must be kept within a sealed container.

In rotational viscometers of the aforementioned compliant element type, the permissible angular deflection of the compliant element is limited to 360°, thus limiting the dynamic range of viscous torque or viscosity over which the viscometer can be operated. To enlarge the useful dynamic range, commercial rotational viscometers of the compliant element type are provided with a number of different size spindles, and with a variety of springs or other compliant elements having different elastic constants. These springs and spindles must be interchanged in various combinations to provide the dynamic range which is required for practical commercial instruments. The necessity for frequent interchange of spindles and springs or other compliant elements limits the usefulness of such viscometers for remote monitoring applications, and makes their use in the laboratory time consuming and cumbersome. In addition, the delicate springs are easily damaged by twisting of the motor shaft when the spindle or spring is being changed, or during handling of the instrument. An example of the cumbersome nature of viscometers of the rotational spring deflection type is the Brookfield Synchro-electric unit, a commercially successful viscometer which is provided with seven different spindles and eight different deflection springs for a total of 56 different ranges. A separate calibration table is provided for each range, and must be consulted in order to convert the observed spring deflection to viscosity units. This large number of ranges is a serious drawback, and the required frequent changing of spindles and springs may, in addition to the disadvantages mentioned above, present a health or safety hazard to the user where dangerous liquids are involved.

In a modification of the compliant element rotational viscometer technique discussed above, the spindle is rigidly connected to the motor shaft, but the liquid container is mounted on a rotatable support, which is connected through a spring to a firm base. The liquid transmits viscous torque to the container walls and thereby deflects the spring. Systems of this nature suffer from many of the disadvantages previously mentioned, and are generally unsuitable for remote monitoring applications.

Another class of rotational viscometers employs relatively rigid connections between the spindle and drive motor, with the viscous drag due to immersion of the spindle in the liquid whose viscosity is to be determined being measured by monitoring the increased motor drive requirements. This is done by measuring the voltage, current, power or another electrical parameter which changes with changes in the load driven by the motor. While rotational viscometers of this type overcome the disadvantages associated with the use of springs, torsion shafts and sensitive deflection transducers, they have heretofore been plagued by limited dynamic range, inability to operate over a wide range of angular speeds, and inability to meet the accuracy and repeatability requirements of commercial instruments. Examples of a number of viscometers of this type, which will be referred to herein as the motor drive-sensing type, are summarized below.

U.S. Pat. No. 2,485,424 employs a coupled pair of Selsyn motor units, the rotor of one Selsyn unit being driven by a synchronous motor at a speed corresponding to the frequency of the AC power line. The rotor of the other Selsyn unit is connected to one end of a shaft, the other end of which has a disc affixed thereto, the disc being immersed in the liquid whose viscosity is to be determined. The current flowing between the two Selsyn units varies in accordance with the load placed upon the unit driving the immersed disc. By monitoring this current, a measure of liquid viscosity is provided. This relatively crude arrangement is capable of operating at only a single angular speed, is incapable of measuring low viscosity values, and has a dynamic range of approximately one decade, as indicated by the curve shown in FIG. 2 of the patent.

In U.S. Pat. No. 2,572,693 a two-phase motor is employed to drive the shaft and the attached spindle which is immersed in the liquid under investigation. The speed of the motor is determined by the frequency of the AC power line and the number of poles on the motor. A measure of viscosity is provided by monitoring the current drawn by one of the motor phases. This system has a limited dynamic range and is capable of performing viscosity measurements only at or near the synchronous speed of the motor. As stated at the bottom of column 3 of this patent, the motor speed decreases or increases slightly in response to increases or decreases in viscosity. Thus the exact rotational speed at which viscosity is determined cannot be preset, a serious drawback in precision applications where it may be necessary to measure liquid viscosities at a predetermined exact speed. Column 2 of this patent contains an obviously incorrect statement to the effect that ". . . in any electric motor the current input is a funcion of the ratio torque divided by speed of rotation . . . ", since it is evident that a motor generating high torque at high speed will draw substantially more current than the same motor generating low torque at low speed.

U.S. Pat. No. 2,679,157 employs a magnetic coupling mechanism to provide electrically-variable coupling between a synchronous drive motor and a spindle immersed in a liquid under investigation. The power supply to the magnetic coupling device is manually adjusted so as to maintain the rotational speed of the spindle at a predetermined constant value, necessarily slower than the speed of rotation of the synchronous motor. This system is of limited sensitivity due to the extraneous losses introduced by the magnetic coupling device and by the speed indicator mounted or geared to the spindle shaft. Viscosity can be measured only at the predetermined speed to which the spindle shaft is adjusted by varying the power supplied to the magnetic coupling device. The exposure of the speed indicator to liquid splatter and fumes, and the hermetic sealing required to contain the magnetic particle suspension used for the coupling medium of the magnetic coupling device are additional disadvantages.

The arrangement shown in U.S. Pat. No. 3,316,754 employs a synchro system in which the rotor of a synchro transmitter is driven at a constant speed by a synchronous motor, with the rotor of a synchro receiver being connected to a spindle immersed in the liquid whose viscosity is to be determined, the synchro transmitter and receiver being electrically interconnected. The coupling between the synchro units causes the synchro receiver to rotate at the same speed as the synchronous motor and synchro transmitter, with a phase lag dependent on the viscous drag introduced by the liquid. This phase lag is converted to an output voltage by a synchro control transformer mechanically and electrically coupled to the synchro transmitter, the output voltage being a function of the liquid viscosity. This arrangement, which is similar in principle to that of U.S. Pat. No. 2,485,424, has similar disadvantages of limited dynamic range and the capability of measuring viscosity only at a single rotational speed determined by the AC power line frequency.

In U.S. Pat. No. 3,343,405 the torque transmitted from a rotating bob through the liquid sample to a cylindrical container supported on a rotatable shaft is automatically counterbalanced by a circuit which generates a torque sufficient to prevent rotation of the shaft. This viscometer, which does not measure any parameter associated with the bob drive motor requires complex and expensive electromechanical components, as well as expensive precision bearings for supporting the rotatable shaft. Small values of friction or stiction of the shaft and its associated support elements can cause relatively large errors in viscosity readings. For accurate measurements at low viscosities a large container must be used, requiring a large liquid sample (not always available in the laboratory), and the bob must be precisely concentric with the container walls. The structure of this viscometer does not readily lend itself to monitoring applications.

U.S. Pat. No. 3,722,262 provides a modification of the arrangement shown in U.S. Pat. No. 3,343,405, for the purpose of measuring viscosities at extremely low angular speeds, on the order of small members of cycles per hour or per day. This is accomplished by the use of an angular position control loop to vary the rotational position of a shaft supporting the liquid container in accordance with a waveform provided by a function generator. A fixed bob is suspended within the liquid, and rotation of the container is resisted by the viscous drag of the liquid due to relative movement between the container and bob. This arrangement is not suitable for use at higher rotational speeds, since the position control loop would be incapable of sufficiently rapid response to avoid slippage and ambiguity. As in the case of U.S. Pat. No. 3,343,405, complex and expensive exectromechanical components are required, including in this case a gas bearing system for supporting the rotating shaft. A measure of viscosity is provided in this system by monitoring the current supplied to the torque generating microsyn element which drives the container supporting shaft.

Accordingly, an object of the present invention is to provide an improved rotational viscometer of the motor drive-sensing type.

Another object of the invention is to provide a rotational viscometer of said type which is capable of providing a true viscosity indication which permits the determination of the Newtonian or non-Newtonian character of a liquid without resort to computation or calibration charts.

As herein described apparatus is provided for determining the viscosity of a liquid medium. A fluid shearing spindle for immersion in the liquid medium is affixed to a rotatable shaft. A drive motor is provided for rotating the shaft at a desired angular speed. The drive motor has two excitation terminals for providing a controllable drive current thereto. The torque developed by the motor is directly proportional to the drive current, which has a given residual value when the spindle and shaft are rotated in air by the motor, and a maximum permissible operating value. A power amplifier supplies the motor drive current in response to an input signal applied to the amplifier. The apparatus includes means for providing a first signal corresponding to the desired angular speed of rotation of the shaft. A tachometer is coupled to the shaft to provide a second signal corresponding to the actual angular speed of rotation thereof. Suitable means is included for providing an input signal to the power amplifier corresponding to the difference between the first and second signals, so that the power amplifier supplies a drive current to the motor which varies in accordance with said signals to maintain the angular speed of rotation of the shaft at the desired value. Current sensing means provides a third signal proportional to the motor drive current, and compensation means generates a fourth signal corresponding to the residual motor drive current, and subtracts the fourth signal from the third signal to provide a fifth signal proportional to the viscous torque applied to the spindle and the adjacent part of the shaft by the liquid medium in which the spindle is immersed.

In the Drawing:

FIG. 1 shows a viscosity measuring apparatus according to an embodiment of the present invention;

FIG. 2 shows curves of motor drive current versus motor speed for use of the apparatus of FIG. 1 with liquids of varying viscosities;

FIG. 3 shows the resistance versus shaft rotation characteristic of the function potentiometer employed in the apparatus of FIG. 1;

FIG. 4 shows plots of viscosity versus motor speed for Newtonian and non-Newtonian liquids, as obtained with the measuring apparatus of FIG. 1;

FIG. 5 shows a viscosity measuring apparatus according to an alternative embodiment of the invention;

FIG. 6 shows a modification of the arrangement of FIG. 5 which provides improved performance at low measurement speeds; and FIG. 7 shows waveforms helpful in explaining the operation of the modification shown in FIG. 6.

As shown in FIG. 1 a generally cylindrical container 10 is filled with a liquid medium 11 the viscosity of which is to be determined. The liquid medium 11 may, for example, comprise (i) one or more Newtonian fluids such as low concentration solutions, mineral oils, vegetable oil, or distilled water; (ii) thixotropic materials such as cosmetics, reaction motor fuels, polymer-thickened mineral oils, or ink; (iii) plastic fluids such as grease, putty, molding clay, etc.; (iv) pseudoplastics such as water based fluids, resins, paints, chocolates, butter or sauces; or (v) dilatants such as pastes, color pigments, ceramics and frits. These liquid media may typically have viscosities in the range of 1 to 100,000 centipoise.

Immersed in the liquid medium 11 is a fluid shearing spindle 12, which is secured or affixed to one end of a relatively rigid shaft 13. The spindle 12 is preferably of a generally cylindrical configuration, but may if desired be shaped in the form of a cone or other object of revolution. The structure of the spindle 12 should be such that when the shaft 13 and spindle 12 are rotated, the interaction of the spindle 12 and the adjacent portion of the shaft 13 with the liquid medium 11 results in essentially laminar flow of the medium 11 relative to the spindle 12. A threaded coupling or other suitable connecting means (not shown in FIG. 1) is provided to enable removal of the spindle 12 from the shaft 13 for cleaning or substitution of spindles of other sizes or shapes.

Secured to the end of the shaft 13 which is remote from the spindle 12 is a drive motor 14. The motor 14 has positive and negative excitation terminals 15 and 16 respectively, and is a type of electric motor which develops a torque directly proportional to the drive current flowing between the terminals 15 and 16. The motor drive current has a predetermined maximum permissible operating value beyond which the motor is unsuitable for use, either because of thermal overload, nonlinearity, or both. The drive motor 14 should preferably be such that the residual drive current drawn by the motor when the spindle 12 and shaft 13 are rotated in air is less than 5percent of the maximum permissible operating value of said drive current.

Preferably, the drive motor 14 is of the permanent magnet DC type. Improved torque versus current linearity and low rotor inertia can be achieved by use of a permanent magnet DC motor having an armature wound on a hollow non-magnetic core. Such motors, having no magnetic material in the armature or rotor, are known as "ironless" motors. A suitable motor for this purpose is a two-pole, permanent magnet, DC, ironless motor manufactured by Portescap, a Swiss company having offices in New York City, N.Y. A typical unit of this type has a maximum permissible operating current on the order of 300 milliamperes, and a residual current when the motor is operated in air (with the shaft 13, spindle 12 and a tachometer generator 17 attached thereto) on the order of 10 milliamperes. The residual current is extremely stable, and does not vary more than approximately 0.1 milliampere, so that after compensation of residual current as will hereinafter be described, the motor is capable of providing a dynamic range of current or torque measurement from 0.1 to 300 milliamperes, i.e. 3,000:1 or approximately 3½ decades. The torque generated by the aforementioned motor at its maximum permissible operating current is on the order of 1.9 ounce-inches. The motor is capable of accurate and reliable operation over a speed range from 0.5 RPM to well in excess of 1,000 RPM.

As seen in FIG. 1, the shaft 13 extends upwardly from the motor 14 and drives a DC tachometer generator 17 having positive and negative output terminals 18 and 19 respectively. The negative terminal 19 of the tachometer 17 is grounded, and a DC voltage is provided at the positive terminal 18 which is directly proportional to the angular speed of rotation ω of the shaft 13 and spindle 12.

A DC voltage source 20 is connected across the series combination of four resistors 21, 22, 23 and 24. The negative terminal of the source 20 and the terminal of resistor 24 to which it is connected are grounded. The other terminals of resistors 21 through 24 are connected to terminals 1, 2, 3 and 4 of a speed selector switch S1. By setting the selector switch S1 in one of the positions 1 through 4, any desired range of angular speed of rotation ω of the shaft 13 and spindle 12 may be selected from 0.1 to 1 RPM (position 1) to 100 to 1,000 RPM (position 4). The arm 25 of the selector switch S1 is connected to one end of a speed selection potentiometer 26, the other end of the potentiometer 26 being grounded. The speed selection potentiometer 26 may be rotated manually to provide the desired speed of rotation, or alternatively may be automatically rotated by a scanning motor 27 to provide an automatic speed sweep across the selected range.

A mode selection switch 28 provides for manual selection of rotational speed ω of the shaft 13 and spindle 12 when placed in position 1 thereof, and for automatic variation of rotational speed throughout a selected range when placed in position 2 thereof. In the automatic position suitable speed sweep control signals are applied to the programming motor 27 by a speed sweep programmer 29.

Whether operated in the manual or automatic mode, a DC voltage corresponding to the desired rotational speed of the shaft 13 and spindle 12 appears on the arm 30 of the speed selection potentiometer 26. This speed control signal, which represents the desired rotational speed, is fed to one input terminal of a comparator 31, and the output voltage from the tachometer generator 17, which corresponds to the actual speed of rotation of the shaft 13 and spindle 12, is fed to another input terminal thereof. The comparator 31 acts as a difference circuit to provide an output voltage on line 32 which corresponds to the difference between the two input voltages thereto, i.e. the difference between the desired and actual rotational speed of the shaft 13 and spindle 12.

The resulting speed correction signal on line 32 is coupled to an input terminal 33 of a DC operational power amplifier A1 through an input resistor 34. When used in conjunction with a motor 14 of the type previously described, the DC operational amplifier A1 should preferably have a power output capability on the order of 15 watts. The output terminal 35 of the amplifier A1 is connected to terminal 15 of motor 14 through a variable torque limiting resistor 36. Terminal 15 of motor 14 is connected to input terminal 33 of operational power amplifier A1 through a variable gain control feedback resistor 37. The torque limiting resistor 36 has a value substantially less than that of the feedback resistor 37, so that the closed loop gain of the operational power amplifier A1 is essentially determined by the ratio of the resistance of the gain control resistor 38 to that of the input resistor 34.

The elements so far described constitute a feedback control system which operates to maintain the angular speed of rotation ω of the shaft 13 and spindle 12 at a desired value as established by the speed range selector switch S1 and the speed selection potentiometer 26. The actual speed of rotation of the shaft 13 is continuously sensed by the tachometer generator 17, the output voltage of which is continuously compared with the voltage on the arm 30 of potentiometer 26, by the comparator or difference circuit 31. The output of the comparator 31 is applied to the operational power amplifier A1, which applies sufficient current to the motor 14 via its excitaion terminals 15 and 16 to maintain the angular speed of rotation of the shaft 13 and spindle 12 at the desired value. Whenever the motor speed is less than the desired value, the amplifier A1 supplies additional current to the motor drive winding via terminals 15 and 16 to increase the motor speed. Whenever the motor speed is greater than the desired value, the amplifier A1 supplies a relatively small current, or no current at all, to the motor drive winding, so that the drive winding essentially discharges through the low output impedance of the amplifier A1, thus applying an electromechanical braking torque to the motor. The gain control resistor 37 is adjusted by monitoring the transient response of the system to sudden changes in the desired speed voltage on line 30, with the gain control being adjusted to provide optimum transient response without instability.

The operational amplifier A1 may comprise an integrated circuit operational amplifier designated as type 741 and presently marketed by a number of semiconductor manufacturers, including Fairchild Semiconductor, Motorola and Texas Instruments. Since this integrated circuit operational amplifier has a relatively low power output capability, a power output stage must be added to provide the 15 watt power output which is preferred for satisfactory steady state and transient operation of the motor 14.

In order to protect the armature winding of the motor 14 from damage due to current overload, a torque limiting circuit comprising the torque limiting resistor 36, Zener diode 38, resistor 39, operational amplifier 40 and diode 41 is provided. This circuit operates to sense the voltage developed across the torque limiting resistor 36, and to apply a control voltage to the gain control input terminal 42 of the operational power amplifier A1, so as to prevent the current supplied to the motor 14 from exceeding a value determined by the setting of the torque limiting resistor 36.

Preferably, the Zener diode 38 should have a breakdown voltage which is small compared to the lowest voltage developed across the motor excitation terminals 15 and 16 during normal operation. The operational amplifier A2 is of the differential input type, having a non-inverting input terminal 43 and an inverting input terminal 44, so that the voltage at the amplifier output terminal 45 has a magnitude and polarity corresponding to the difference between the input voltages applied to terminals 43 and 44.

When the current flowing through the torque limiting resistor 36 and the motor armature is such that the voltage developed across the resistor 36 is less than the breakdown voltage of Zener diode 38, no current flows through resistor 39, so that input terminals 43 and 44 of operational amplifier A2 are at the same potential, and the output of the amplifier at terminal 45 is essentially at ground potential. Under these conditions the output of amplifier A2 is insufficient to forward bias the diode 41, and no gain control signal is applied to terminal 42 of operational power amplifier A1.

When the current drawn by the motor 14 exceeds the overload value established by the setting of the torque limiting resistor 36, the voltage developed across the resistor 36 exceeds the breakdown voltage of Zener diode 38, causing Zener diode 38 to become conductive, and a small voltage to be developed across resistor 39, of a polarity such that the non-inverting input terminal 43 of amplifier A2 is positive relative to its inverting input terminal 44. This small positive voltage is greatly amplified by the high gain of the operational amplifier A2, causing diode 41 to become conductive and thereby applying a gain control voltage to the gain control terminal 42 of amplifier A1, so as to reduce the gain of amplifier A1 and thus its output voltage and the current supplied to the armature of motor 14 through torque limiting resistor 36. The resulting decrease in the voltage developed across resistor 36 is fed back through Zener diode 38, resistor 39 and amplifier A2, so that the torque limiting feedback loop described above operates to maintain the current through motor 14 at the value established by torque limiting resitor 36, until such time as the motor speed and/or load change in such a direction that the current drawn by the motor 14 drops below the overload value. The value of the torque limiting resistor 36 should be such that the maximum voltage developed across this resistor under overload current conditions is small compared to the lowest voltage developed across the motor excitation terminals 15 and 16 under normal operating conditions.

For a motor of the type previously described, having a maximum permissible operating current on the order of 300 milliamperes, the overload current at which the torque limiting circuit is brought into operation may typically be on the order of 350 milliamperes.

The motor drive current flowing through the excitation terminals 15 and 16 is caused to flow through one of five current measuring resistors 46 through 50, as determined by the setting of the viscosity range selector switch S2. These current measuring resistors are selected so that (i) the maximum voltage developed across each resistor is small compared to the lowest voltage developed across the motor excitation terminals 15 and 16 under normal operating conditions, and (ii) the same voltage is developed across each resistor when the viscosity is equal to the maximum value for the particular range to which the resistor corresponds.

In order to permit maximum utilization of voltage changes due to variations in the current through the motor 14 caused by viscous interaction between the liquid medium 11 and spindle 12, a compensation circuit comprising the DC voltage source 51 and residual current compensation potentiometer 52 is provided.

Since the motor 14 has an electrical characteristic such that the torque developed by the motor is directly proportional to the current flowing through its excitation terminals 15 and 16, i.e. the current I, the voltage developed across the selected one of the current measuring resistors 46 through 50, i.e. the voltage between motor excitation terminal 16 and ground, is directly proportional to motor torque. To eliminate the portion of this voltage which is due to factors other than the viscous torque applied to the spindle 12 and the adjacent portion of the shaft 13 by the liquid medium 11, the spindle 12 is removed from the liquid medium 11 and allowed to rotate in air. Under these conditions the residual current compensation potentiometer 52 is adjusted so that the voltage developed across function potentiometer 53 is zero. When this is done the voltage developed between terminal 16 and the arm 54 of compensation potentiometer 52 corresponds to the residual or no-load drive current of the motor 14, i.e. the current due to friction, windage and other extraneous factors. When the spindle 12 is then immersed in the liquid medium 22, this compensation voltage is subtracted from the voltage developed across the selected one of the current measuring resistors 46 through 50, so that the resulting voltage developed between the arm 54 of compensation potentiometer 52 and ground is directly proportional to the viscous torque exerted on the spindle 12 and adjacent part of the shaft 13 by the liquid medium 11.

The function potentiometer 53 has two end terminals, one of which is grounded and the other of which is connected to the arm 54 of compensation potentiometer 52. The resistance between the end terminals of function potentiometer 53 is much greater than the resistance of any of the current measuring resistors 46 through 50, in order to preclude any significant inaccuracies due to loading of the current measuring resistors by the potentiometer 53.

The arm 55 of function potentiometer 53 is mechanically coupled to the arm 30 of the speed selection potentiometer 26. The voltages developed at the arm of the function potentiometer 53 and the speed selection potentiometer 26, with respect to ground, are coupled to a digital display and chart recorder unit 56.

Thus a voltage corresponding to the speed of rotation of the shaft 13 and spindle 12 is provided to the display and recorder unit 56 on line 57, and another voltage which corresponds to the ratio of the viscous torque developed by the motor 14 to the speed of rotation of the motor shaft 13 and spindle 12, is provided to the display and recorder unit on line 58, as will hereafter be described.

FIG. 2 shows a plot of torque or motor drive current of the motor 14, as measured by the voltage developed across the selected one of the current measuring resistors 46 through 50, i.e. between motor terminal 16 and ground, versus the angular speed of rotation $\omega$ of the motor shaft 13 and spindle 12. Five curves are provided, i.e. for the no-load condition wherein the spindle 12 and shaft 13 rotate in air, i.e. viscosity $\eta$ equals zero, and for immersion of the spindle 12 in Newtonian fluids of successively greater viscosities $\eta_1$, $\eta_2$, $\eta_3$ and $\eta_4$. It is evident from these curves that, subject to an offset current $I_0$ which is eliminated by the compensating voltage developed between the arm 54 of compensation potentiometer 52 and terminal 16 of motor 14, the viscosity of each of these fluids varies linearly with angular speed or shear rate, the latter being defined as the speed of rotation of the shaft 13 and spindle 12 in radians per second. The slope of each line corresponds to the viscosity of the liquid medium 11 in which the spindle 12 is immersed. Thus the voltage developed between the ends of the function potentiometer 53, which corresponds to the viscous torque after the residual motor drive current $I_o$ has been removed by the compensation circuit comprising voltage source 51 and potentiometer 52, is directly proportional to viscosity.

The true value of the viscosity of the liquid medium 11, i.e. a value which is independent of shear rate for Newtonian liquids, is given by the equation:

$$\eta = k \frac{I-I_o}{\omega} = k' \frac{V_{54}}{\omega} \qquad (1)$$

where eta is the viscosity, $k$ and $k'$ are constants, $I$ is the total current flowing through the excitation terminals 15 and 16 of drive motor 14, $I_o$ is the residual motor drive current due to factors other than viscous interaction between the liquid medium 11 and spindle 12, $\omega$ is the angular speed of rotation of the shaft 13 and spindle 12, and $V_{54}$ is the voltage developed between the arm 54 of compensation potentiometer 52 and ground.

The function potentiometer 53 is provided with a resistance versus shaft rotation contour of hyperbolic configuration, as illustrated in FIG. 3. That is, the resistance between the arm 55 and ground varies according to the equation:

$$\rho = \frac{C}{\theta} = \frac{C'}{\omega} \qquad (2)$$

where $\rho$ is the resistance between the potentiometer arm 55 and the ground end of the potentiometer, $C$ and $C'$ are constants, and $\theta$ is the angle of rotation of the potentiometer arm 55 with respect to the upper end of te potentiometer.

Since the arm of potentiometer 53 is mechanically coupled to the arm of speed selection potentiometer 26, it is evident from Equation 2 that the resistance between the arm 55 of function potentiometer 53 and ground is inversely related to the angular speed of rotation $\omega$ of the motor shaft 13 and spindle 12. Furthermore, since the voltage applied across the ends of function potentiometer 53 is proportional to net motor current or viscous torque, it is evident that the voltage developed between the arm 55 of function potentiometer 53 and ground corresponds to the ratio of viscous torque to angular speed of rotation or shear rate. Thus the function potentiometer 53 essentially performs a dividing function, providing the torque to angular speed ratio which corresponds to true viscosity.

When the true viscosity voltage so obtained is fed to the digital display and chart recorder unit 56 on line 58 and plotted against motor angular speed or shear rate, curves such as those indicated by the numerals 1, 2 and 3 in FIG. 4 are obtained for Newtonian, dilatant and thixotropic liquids respectively. it is seen that for Newtonian liquids, as previously discussed, the true viscosity signal on line 58 is independent of shear rate. For a dilatant liquid, as indicated by curve 2, the true viscosity signal increases with increasing angular speed or shear rate, while for a thixotropic liquid medium the true viscosity signal decreases with increasing angular speed or shear rate. Thus the Newtonian or non-Newtonian character of the liquid medium 11 can be quickly and easily determined, either manually or automatically, by varying the speed setting of the speed scale selector switch S1 and speed selection potentiometer 26, and observing the value of the true viscosity signal on line 58, as displayed on the digital display or plotted by the chart recorder. Thus an indication of the Newtonian or non-Newtonian character of the liquid medium 11 is readily obtained merely by turning the speed selector switch S1 and potentiometer 26 to various settings, and watching the digital display of true viscosity to observe whether there is any change. This procedure is far more rapid and simple than that possible with prior art viscometers, which provide arbitrary plots of shear stress versus shear rate, resulting in non-linear curves which must be evaluated by reference to calibration charts to determine the Newtonian or non-Newtonian character of a liquid. Those of these prior art units which permit a determination of true viscosity, require the measurement of the slopes of the non-linear curves derived from or plotted by such instruments in order to make the true viscosity determination.

A more precise and sophisticated version of the viscometer of FIG. 1 is shown in FIG. 5, wherein operational techniques are employed for the measurement of motor current and the division of viscous torque by shear rate.

The circuitry for providing a voltage corresponding to the desired speed of angular rotation of the shaft 13 and spindle 12, and the motor speed feedback control system and associated torque limiting circuitry shown in FIG. 5 operate in similar fashion to the corresponding circuits of FIG. 1, circuit elements which perform similar functions being identified with identical numerals in FIGS. 1 and 5. The operational amplifier A1a of FIG. 5 is similar to the DC operational power amplifier A1 of FIG. 1, except that the differential input capability of the amplifier A1a is utilized to perform the difference function which was performed by the comparator 31 in the circuit of FIG. 1. The voltage generated by the tachometer 17, corresponding to actual rotational speed of the shaft 13, is coupled to the non-inverting input terminal of DC power amplifier A1a, while the voltage on line 59, corresponding to the desired speed of angular rotation, is coupled to the inverting input terminal of amplifier A1a through input resistor 34. The differential input stage within the amplifier A1a then performs the required comparison function to internally provide a speed correction signal corresponding to the difference between the voltages which represent the actual and desired shaft rotation speeds.

The operational amplifiers A2 through A9 are also of the DC coupled differential input type, and are likewise constructed so that under open loop conditions the output voltage of each amplifier is determined by the amplifier open loop gain multiplied by the difference between the potentials applied to the two input terminals thereof. The polarity of the output voltage of each amplifier is dependent upon the polarity of the difference between the input voltages applied to its non-inverting and inverting input terminals respectively. In FIG. 5, the upper input line to each of the operational amplifiers A2 and A4 through A9 is connected to the inverting input terminal thereof, while the lower input line is connected to the non-inverting input terminal thereof. Each of the operational amplifiers A2 through A9 may utilize the type 741 integrated circuit operational amplifier previously discussed. In order to provide optimum compatibility with the long time constant filtering functions associated with amplifiers A5 and A8, these amplifiers should preferably be provided with high impedance input stages utilizing, e.g., field effect transistors.

Operational amplifier A3 is connected to operate as a voltage following amplifier or impedance converter, i.e. with the input voltage corresponding to the desired speed of rotation of the shaft 13 applied to its non-inverting input terminal and the output line 59 of the amplifier A3 connected directly to its inverting input terminal. Under these conditions the output voltage on line 59 is precisely equal to the input voltage at the non-inverting terminal, with the amplifier presenting a very high input impedance to the speed selection circuitry and a very low output impedance.

The input voltage to the non-inverting terminal of amplifier A3 is selected by the mode selection switch 28, which in position 1 enables manual selection of the desired speed range and speed value by means of section S1a of the speed scale selector switch S1, and the speed selection potentiometer 26. When the mode selector switch 28 is in position 2, a voltage which varies in accordance with the desired speed sweep is provided to the non-inverting input terminal or amplifier A3 by a speed sweep signal generator 29a. This voltage waveform may typically be triangular or sinusoidal, to cause the angular speed of the shaft 13 and spindle 12 to vary within a desired range and at a desired rate.

As previously discussed, the motor speed control system operates to maintain the angular speed of rotation $\omega$ of the motor shaft 13 at a value corresponding to the voltage on line 59. This control voltage, corresponding to shaft rotational speed, is coupled to operational amplifier A6, which with its associated circuitry acts as a speed scaling circuit and filter. Amplifier A6 is provided with an input resistor 60 through which the signal on line 59 is coupled to the non-inverting input terminal of the amplifier. The output of amplifier A6 on line 61 is coupled to an operational divider circuit 62, which in well known fashion comprises a multiplier 63, and an operational amplifier A7 having input resistors 64 and 65 connected to its non-inverting input terminal. The output terminl 66 of amplifier A7 is connected to one input of the multiplier 63, the other input of the multiplier 63 being connected to the output of amplifier A6 as previously mentioned. The output of multiplier 63 is connected to the non-inverting input terminal of amplifier A7 through input resistor 65, and a scaled voltage corresponding to the viscous torque to which the spindle 12 and the adjacent portion of the shaft 13 are subjected due to interaction with the liquid medium 11, is provided on line 67 and applied to the non-inverting input terminal of amplifier A7 through input resistor 64. As is well known in the operational amplifier art, the resulting output voltage on line 66 is directly proportional to the ratio of the voltage on line 67 to the voltage on line 61, i.e. to the ratio of viscous torque to angular rotational speed or shear rate, and is therefore proportional to true viscosity.

The multiplier 63 of the dividing circuit 62 is preferably a suitable non-linear device such as a Hall-effect multiplier. Such devices generally have a limited dynamic range of voltage variation within which high accuracy and precision can be maintained. Therefore the operational amplifiers A4, A5 and A6 are provided with feedback resistors which perform a scaling function to maintain the input voltages to the divider 62 on lines 67 and 61 within this optimum voltage range. The speed representing voltage on line 59 is scaled by the ratio of the selected one of the feedback resistors 68 through 71 of amplifier A6 to the input resistor 60, the proper resistor being selected by the section S1c of the speed range selector switch S1, the arm of which is mechanically coupled to the arm of section S1a as well as the arms of sections S1b and S1d of selector switch S1. Thus the speed representing voltage supplied to the dividing circuit 62 on line 61 is maintained within the optimum operating range of the divider circuit, regardless of the speed scale upon which the selector switch S1 is set at any particular time. Similarly, the viscosity scale selector switch is provided with sections S1a and S2b to provide proper scaling of voltages to provide the desired optimum voltage input range of values to the divider circuit 62. The operational amplifier A4 acts as a current to voltage converter and also performs a viscosity scaling function by virtue of the scaling resistors 72 through 75 to which section S2a of the viscosity scale selector switch S2 is connected.

Operational amplifier A5 performs a similar scaling function to maintain the voltage on line 67 within the desired optimum range regardless of the particular speed scale utilized. Amplifier A5, by virtue of the DC voltage source 51a and compensation potentiometer 52a connected to its inverting input terminal, operates to provide compensation of the residual current through the motor 14 when the shaft 13 and spindle 12 are rotated by the motor in air. Amplifier A5 also has a feedback capacitor 77 coupled between its output and non-inverting input terminals, to provide filtering of the viscous torque representing input voltage thereto.

Since the input voltages to the divider circuit 62 on lines 61 and 67 are scaled up or down to maintain them within the desired optimum range, the output of the divider circuit 62 on line 66 must correspondingly be scaled down or up in order to provide the desired true viscosity-indicating output signal to the digital display meter 56a and chart recorder 56b. This reciprocal scaling is accomplished by operational amplifiers A8 and A9. Amplifier A8 provides reciprocal scaling of speed by virtue of feedback resistors which are connected to section S1d of the speed scale selector switch S1. Similarly, amplifier A9 provides reciprocal scaling of net motor current or viscous torque by virtue of feedback resistors connected to Section S2b of the viscosity scale selector switch S2.

The gain of amplifier A9 is adjustable by means of the variable input resistor 84, which acts as a container size adjustment. For a given configuration of the spindle 12, the viscous force exerted upon the spindle by a given liquid at a given shear rate depends upon the diameter of the container 11, the viscous interaction being inversely proportional to the container diameter. Therefore the variable resistor 84 is calibrated according to container diameter, so as to increase the gain of the amplifier in proportion to the container diameter. This adjustment feature permits containers of various sizes to be used, without the need for recalibration of the equipment of reference to complex calibration charts.

Amplifier A8 also contains a feedback capacitor 78 connected between its output and non-inverting input terminals, which serves to provide additional filtering of the voltage on line 67 which corresponds to true viscosity of the liquid medium 11. Connected to the inverting terminal of amplifier A8 is a zero adjustment circuit comprising a bidirectional voltage source 79 connected across the ends of a zero adjustment potentiometer 80, the arm of the potentiometer 80 being connected to the inverting terminal of amplifier A8. In operation of the viscosity measuring system of FIG. 5, the zero adjustment potentiometer 80 is adjusted with the system operating and the shaft 13 and spindle 12 being rotated by the motor 14 in air, the compensation potentiometer 52a having been previously adjusted, the potentiometer 80 being adjusted to provide zero readings on the digital meter 56a (in the upper or viscosity indicating position of its selector switch 81) and the chart recorder 56b (for its upper or viscosity indicating input signal). This zero adjustment of the potentiometer 80 compensates for the various operational amplifier drift voltages and any other extraneous signals within the viscosity measuring system.

The manner in which the operational amplifier A4 acts as a current to voltage converter is as follows. The motor drive current I flowing between the motor excitation terminals 15 and 16 also flows toward the non-inverting input terminal of amplifier A4. Similarly, a feedback current $I_f$ flows from the output terminal of amplifier A4 toward its non-inverting input terminal through a selected one of the feedback resistors 72 through 76. Due to the substantial input impedance and very high gain of the operational amplifier A4, the feedback resistor operates to provide sufficient current feedback to maintain the current and voltage at the non-inverting input terminal at substantially zero values. Thus the feedback current $I_f$ is at all times maintained exactly equal to the motor drive current I, and the output voltage of the amplifier A4 is therefore directly proportional to the motor drive current. Moreover, since the non-inverting input terminal to which the negative excitation terminal 16 of the motor 14 is connected, is at all times maintained at substantially ground potential, the current to voltage converter circuit introduces substantially no impedance in series with the motor armature, permitting substantially the entire voltage generated by the operational power amplifier A1a to be applied across the motor excitation terminals 15 and 16, and avoiding the deterioration in transient response which would otherwise result if a current measuring resistance were inserted in series with the motor armature.

The resulting output voltage of amplifier A4 is directly proportional to the torque developed by the motor 14, scaled according to viscosity by the viscosity scale selector switch section S2a. This output voltage is applied to the non-inverting input terminal of operational amplifier A5 through an input resistor 82. Feedback resistors connected to Section S1b of the speed scale selector switch S1 provide scaling of the torque indicating voltage according to speed, the output of amplifier A5 on line 67 being scaled according to both viscosity and speed. The feedback capacitor 77 between the output and non-inverting input terminals of amplifier A5 acts in conjunction with the selected feedback resistor and the input resistor 82 to provide filtering of the signal being amplified and scaled, the value of the capacitor 77 being selected so that this filter circuit has a time constant on the order of 100 seconds in the lowest speed range (0.1 to 1.0 RPM), and correspondingly shorter time constants in the higher speed ranges.

In order to provide compensation of the residual motor current $I_o$, the shaft 13 and spindle 12 are rotated in air by the drive motor 14, and the compensation potentiometer 52a is adjusted so that the output voltage of amplifier A5 on line 67 is zero. When the motor 14 comprises a DC permanent magnet motor having an ironless rotor as previously described, the residual motor current is highly stable and substantially independent of motor speed over the range employed in the viscometer apparatus. Therefore, approximately 99% of the residual motor current can be accurately compensated by the compensation potentiometer 52a, leaving a dynamic range of the viscous torque representing voltage on line 57 corresponding to a current range of 0.1 milliamperes (1% of the 10 milliampere residual current) to 300 milliamperes, or 3,000:1. This is substantially greater than the dynamic range that can be obtained by prior art viscometers without the changing of spindles and/or springs or other compliant elements. Thus the frequency with which the spindle 12 must be changed to accommodate liquid media of varying viscosities is substantially less than the frequency of mechanical element changes associated with prior art viscometers, rendering the apparatus herein described substantially more convenient to use, and more safe in situations where dangerous liquids are involved.

The time constant of the filter circuit associated with amplifier A8 and including feedback capacitor 78 is also on the order of 100 seconds in the lowest speed range, and decreases correspondingly with higher speed ranges. The time constant of the filter circuit associated with amplifier A6 and feedback capacitor 83 is on the order of 0.1 seconds in the lowest speed range, decreasing correspondingly in higher ranges.

Thus the precision viscosity measuring apparatus shown in FIG. 5 enables a highly accurate determination of true viscosity over a wide range of shear rates, permits exact viscosity measurements to be conducted at precisely specified shear rates, and enables the rapid determination of Newtonian or non-Newtonian character of liquid media in an extremely simple fashion, without the need to plot curves, determine slopes or refer to calibration charts.

In the lower speed ranges, i.e. 0.1 to 1 r.p.m. and 1 to 10 r.p.m., undesirable effects have been observed due to the very slow shaft rotation speed. Since the motor is rotating so slowly, frictional effects are irregular, and the frictional resistance to rotation varies with the angular position of the shaft 13. In addition to the kinetic friction effects present at higher speeds, static friction or stiction, and stick-slip effects come into play in the lower speed ranges. The net effect of these phenomena is to introduce variations or "noise" into the motor drive current signal which reduce measurement accuracy. If sufficient filtering were to be provided to substantially reduce these noise effects, a filter time constant on the order of hours would be required, a serious drawback for a practical laboratory or field instrument.

It has been discovered that although the aforementioned frictional effects vary with angular position of the shaft 13, the friction occurring at a particular angular position during successive cycles of rotation of the shaft 13 appears to be relatively stable. This discovery is utilized to provide improved performance in the two lower speed ranges, in the modification of the arrangement of FIG. 5 which is shown in FIG. 6, and explained in connection with the graphs shown in FIG. 7.

The modification shown in FIG. 6 involves the use of a timing arrangement to sample the motor drive current at a given angular position of the shaft 13, and hold this sample until the next sample is taken at the same angular position during the next revolution of the shaft 13. This is accomplished by the use of a timing disc 85 secured to the shaft 13, preferably between the motor 14 and tachometer generator 17.

The timing disc 85 may comprise any relatively rigid, optically opaque material, such as aluminum or a rigid plastic material, and is provided with two arcuate slots 86 and 87, each being disposed at a different radial distance from the center of the disc. Means (not shown in the drawing) is provided to enable the disc 85 to be adjusted in rotational position with respect to the shaft 13, in order that the disc may be so positioned as to result in minimum noise in the motor drive current. A set screw or other conventional means may be employed for this adjustment purpose. The optimum position for the disc 85 may be selected by monitoring the motor drive current as the motor rotates very slowly, and securing the disc 85 at an angular position where the motor drive current waveform exhibits minimal irregularities and is relatively smooth as the shaft 13 rotates through said position.

The lengths of the slots 86 and 87 will vary with the desired angular interval over which the sample is to be taken. Typically, the slot 86 may subtend an angle A of 10° and the slot 87 may subtend an angle B of 30° which includes the angle subtended by the slot 86. An optical sensing circuit comprising the light emitting diode 88, phototransistor 89 and amplifier A11 provides a sampling signal to the sample and hold or boxcar circuit 90 on line 91. Another optical sensing circuit comprising the light emitting diode 92, phototransistor 93 and amplifier A10 provides a motor speed control signal to the speed control relay 94.

The light emitting diode 88 and phototransistor 89 are situated on opposite sides of the disc 85, at the same radial distance from the center of the disc 85 as the arcuate slot 86. Similarly, the light emitting diode 92 and phototransistor 93 are situated on opposite sides of the disc 85, at the same radial distance from the center of the disc 85 as the arcuate slot 87. Thus the phototransistor 89 is illuminated during a period corresponding to 10° of rotation of the shaft 13 in each revolution thereof, the resulting sampling signal output of the amplifier A11 being as shown in the middle waveform of FIG. 7. Similarly, the phototransistor 93 is illuminated during a period encompassing the period of illumination of the phototransistor 89, and corresponding to 30 degrees of rotation of the shaft 13 in each revolution thereof, the resulting motor speed control signal output of the amplifier A10 being as shown in the top waveform of FIG. 7.

This motor speed control signal is applied to the speed control relay 94, which is biased with a battery 95, so that the relay is actuated when the output of A10 is low, and rendered inactive when the output of A10 is high. Thus the motor speed is maintained at the desired value, as established by the voltage on line 59, during the 30° interval which includes the sampling interval, by the motor speed control arrangement of FIG. 5. When the output of A10 goes low outside this 30° interval, however, the relay 94 is actuated, causing a voltage generated by the battery 96 to be applied to line 59, and thereby raising the speed of rotation of the motor 14 and shaft 13 to a value substantially higher than the desired speed at which the viscosity measurement is to be made.

Thus the motor 14 and shaft 13 rotate at the desired low speed during the 30° interval which includes the 10° interval during which the viscosity measurement is made, and rotate at a substantially higher speed, typically 30 to 40 r.p.m., during the remaining 330° of rotation thereof. This arrangement permits a high sampling rate when viscosity is measured at low angular speeds of the shaft 13 and spindle 12, because the shaft and spindle are rotated rapidly during the time between measurements, being slowed to the desired speed approximately 10° of shaft rotation before the measurement is made (see FIG. 7, bottom waveform), so as to allow sufficient time for the speed control system to stabilize and for any transient turbulence effects to subside.

The sampling of the motor drive current is accomplished by the sample and hold circuit 90, which on the two lowest speed ranges is inserted in the line 67 (see FIG. 5) between the output of the Amplifier A5 and the input to the divider circuit 62. When the sampling pulse occurs at the output of amplifier A11, the sampling relay 97 is actuated for 10° of shaft rotation, thereby coupling the output of A5, which corresponds to motor drive current or viscous torque, to the input of an operational amplifier A12 having a high impedance field-effect transistor input stage, through an input resistor 98. The resulting output voltage of amplifier A12 is maintained during the period between samples by the capacitor 99, which should be a high quality, low leakage capacitor, e.g. of the Mylar dielectric type, so that no significant charge will leak off the capacitor in the interval between samples. A stabilizing resistor 100 prevents undesired integration of each sample.

With the arrangement shown in FIG. 6, it has been found that an improvement in low speed noise on the order of 20:1 is realized.

The amplifiers A10, A11 and A12 may be of the same type as the operational units described with reference to FIG. 5, with A12 being provided with a high impedance field-effect transistor input stage. The amplifier A12, in conjunction with the capacitor 99 and resistors 98 and 100, should preferably exhibit a time constant on the order of 1 second when the relay 97 is actuated, and a time constant several hundred times as great when the relay 97 is inactive.

We claim:

1. Apparatus for determining the viscosity of a liquid medium, comprising:
   a rotatable shaft;
   a fluid shearing spindle secured to said shaft, said spindle being immersible in said liquid medium;
   a drive motor for rotating said shaft at a desired angular speed, said motor having two excitation terminals for providing a controllable drive current thereto, the torque developed by said motor being directly proportional to said drive current, said drive current having a predetermined maximum permissible operating value, the residual drive current drawn by said motor when said spindle and shaft are rotated in air by said motor being less than 5 percent of the maximum permissible operating value of said drive current;

a power amplifier for supplying said drive current to said motor in response to a signal applied to at least one input terminal thereof;

means for providing a first signal corresponding to said desired angular speed of rotation of said shaft;

a tachometer coupled to said shaft for providing a second signal corresponding to the actual angular speed of rotation of said shaft;

difference means for providing a speed correction signal corresponding to the difference between said first and second signals, and for coupling said speed correction signal to the input terminal of said amplifier to maintain the angular speed of rotation of said shaft at the desired value thereof;

current sensing means for providing a third signal proportional to said drive current; and compensation means for subtracting from said third signal a fourth signal corresponding to said residual drive current, to provide a fifth signal corresponding to the difference between said third and fourth signals and proportional to the viscous torque applied to said spindle and the adjacent part of said shaft when said spindle is immersed in said liquid medium.

2. Apparatus according to claim 1, further comprising dividing means for providing a true viscosity signal corresponding to the ratio of said fifth signal to said first signal.

3. Apparatus according to claim 2, wherein said dividing means comprises a function potentiometer having a rotatable shaft, two end terminals and a movable tap terminal, the resistance between said end terminals and said movable tap terminal varying according to a hyperbolic function as the shaft of said potentiometer is rotated, means for rotating said potentiometer shaft through an angle corresponding to the value of said first signal, and means for applying said fifth signal across said end terminals.

4. Apparatus according to claim 2, further comprising means for varying said first signal over a desired speed range, and recording means for providing a plot of said true viscosity signal as a function of said first signal, said plot being a horizontal line for any given Newtonian liquid medium in which said spindle is immersed, thereby enabling a determination as to whether said liquid medium is Newtonian to be made by a simple visual inspection of said plot.

5. Apparatus according to claim 2, wherein said dividing means comprises an operational divider circuit having an optimum operating voltage range, further comprising scaling means for varying the original magnitudes of said first and fifth signals and for applying voltages corresponding to the varied magnitudes of said signals to said divider circuit so that said voltages are maintained within said optimum range regardless of the original magnitudes of said signals.

6. Apparatus according to claim 1, wherein said drive motor is a permanent magnet DC motor.

7. Apparatus according to claim 6, wherein said excitation terminals are connected to the armature of said motor, said armature being wound upon a hollow nonmagnetic core.

8. Apparatus according to claim 1, further comprising torque limiting means for limiting the drive current to said motor to prevent damage to the motor when said drive current exceeds said maximum permissible operating value thereof.

9. Apparatus according to claim 1, wherein said current sensing means comprises an operational current to voltage converter, said converter comprising an operational amplifier having an input terminal and an output terminal with a feedback resistor connected between said terminals, one of said motor excitation terminals being connected to said power amplifier and the other of said excitation terminals being connected to said operational amplifier input terminal, so that the current through said feedback resistor is equal to the current through said motor and the voltage at said operational amplifier output terminal is proportional to said motor drive current.

10. Apparatus according to claim 1, further comprising timing means for generating a sampling signal during a predetermined interval of angular position of said shaft, and a sample and hold circuit coupled to said timing means and responsive to said sampling signal for rendering said current sensing means operative only during periods when the angular position of said shaft is within said predetermined interval.

11. Apparatus according to claim 10, further comprising additional timing means for generating a motor speed control signal during a selected interval of angular position of said shaft, said selected interval including said predetermined interval, and motor speed control means coupled to said additional timing means and responsive to said speed control signal for causing said motor to rotate (i) at said desired speed when the angular position of said shaft is within said selected interval, and (ii) at a substantially higher speed when the angular position of said shaft is outside said selected interval.

12. Apparatus according to claim 1, further comprising a generally cylindrical container for holding said liquid medium, and container size adjusting means for modifying said fifth signal in accordance with the diameter of said container.

13. Apparatus for determining the viscosity of a liquid medium, comprising:

a rotatable shaft having a fluid shearing spindle affixed thereto for immersion in said liquid medium;

a drive motor for rotating said shaft at a desired angular speed, said motor having two excitation terminals for providing a controllable drive current thereto, the torque developed by said motor being directly proportional to said drive current, said drive current having a given residual value when said spindle and shaft are rotated in air by said motor and a maximum permissible operating value;

a power amplifier for supplying said drive current to said motor in response to an input signal applied to said amplifier;

means for providing a first signal corresponding to the desired angular speed of rotation of said shaft;

a tachometeer coupled to said shaft for providing a second signal corresponding to the actual angular speed of rotation of said shaft;

means for providing an input signal to said power amplifier corresponding to the difference between said first and second signals, so that said power amplifier supplies a drive current to said motor which varies in accordance with said signals to maintain the angular speed of rotation of said shaft at the desired value;

current sensing means for providing a third signal proportional to said drive current;

compensation means for generating a fourth signal corresponding to said residual motor drive current and for subtracting said fourth signal from said third signal to provide a fifth signal proportional to the viscous torque applied to said spindle and the adjacent part of said shaft by said liquid medium when said spindle is immersed therein; and dividing means for providing a true viscosity signal corresponding to the ratio of said fifth signal to said first signal.

14. The apparatus according to claim 13, wherein said drive motor is a permanent magnet DC motor and said tachometer generator is a DC tachometer.

15. The apparatus according to claim 14, wherein said excitation terminals are connected to the armature of said motor, said armature being wound upon a hollow nonmagnetic core.

16. The apparatus according to claim 13, wherein one of said motor excitation terminals is connected to said power amplifier and the other of said excitation terminals is connected to said current sensing means at a point which acts as a virtual ground, so that essentially the full output voltage of said power amplifier is applied across said motor excitation terminals.

17. The apparatus according to claim 16, further comprising torque limiting means for preventing the drive current through said motor excitation terminals from substantially exceeding the maximum permissible value thereof.

18. Apparatus for determining the viscosity of a liquid medium, comprising:

a rotatable shaft;

a fluid shearing spindle secured to one end of said shaft, said spindle being immersible in a liquid medium;

a permanent magnet DC drive motor for rotating said shaft at a desired angular speed, said motor having two excitation terminals connected to the motor armature for providing a controllable unidirectional drive current thereto, the torque developed by said motor being directly proportional to said drive current, said drive current having a predetermined maximum permissible operating value, the residual drive current drawn by said motor when said spindle and shaft are rotated in air by said motor being less than 5 percent of the maximum permissible operating value of said drive current;

a power amplifier having an output terminal and a differential input stage for supplying said drive current to said motor in response to signals applied to said input stage, said input stage having an inverting input terminal and a noninverting input terminal;

means for providing a first voltage signal corresponding to the desired angular speed of rotation of said shaft;

a tachometer DC generator coupled to said shaft for providing a second voltage signal corresponding to the actual angular speed of rotation of the shaft;

means for coupling said first and second voltage signals to corresponding ones of said power amplifier input terminals;

means for coupling the output terminal of said power amplifier to one of said motor excitation terminals;

an operational current to voltage converter for providing a third voltage signal proportional to said motor drive current, said converter comprising an operational amplifier having an input terminal and an output terminal with feedback resistor connected between said terminals, the other of said motor excitation terminals being connected to said operational amplifier input terminal, the output terminal of said operational amplifier developing said third voltage signal;

a compensation circuit for providing a fourth voltage signal corresponding to said residual motor drive current and for subtracting said fourth signal from said third signal to provide a fifth voltage signal proportional to the viscous torque applied to said spindle and the adjacent part of said shaft by said liquid medium when said spindle is immersed therein; and a divider circuit for computing the ratio of said fifth signal to said first signal to provide a resultant signal corresponding to the true viscosity of said liquid medium.

19. Apparatus for determining the viscosity of a liquid medium, comprising:

a rotatable shaft having a fluid shearing spindle affixed thereto for immersion in said liquid medium;

a drive motor for rotating said shaft;

timing means for generating a sampling signal during a predetermined interval of angular position of said shaft;

measuring means for providing a signal corresponding to the torque applied to said spindle and the adjacent portion of said shaft due to viscous interaction with said liquid medium; and a sample and hold circuit coupled to said timing means and responsive to said sampling signal for rendering said measuring means operative only during periods when the angular position of said shaft is within said predetermined interval.

20. Apparatus according to claim 19, wherein said interval is on the order of 10° of angular rotation of said shaft.

21. Apparatus according to claim 19, wherein said timing means comprises a rotating disc affixed to said shaft, said disc having an arcuate sampling slot therein disposed at a given radius from the center of the disc, an optical circuit comprising a light source and a photodetector disposed on opposite sides of said disc at said given radius from the center thereof, and means coupled to said photodetector for generating a switching signal.

22. Apparatus according to claim 19, further comprising additional timing means for generating a motor speed control signal during a selected interval of angular position of said shaft, said selected interval including said predetermined interval.

23. Apparatus according to claim 22, wherein said additional interval is on the order of 30° of angular rotation of said shaft.

24. Apparatus according to claim 22, wherein said additional timing means comprises an arcuate control slot in said disc, said control slot being disposed at a specified radius from the center of the disc different from said given radius, a second optical circuit comprising a light source and a photodetector disposed on opposite sides of the disc at said specified radius from the center thereof, and means coupled to said photodetector for generating a motor speed control signal.

25. Apparatus according to claim 22, further comprising motor speed control means coupled to said additional timing means and responsive to said speed control signal for causing said motor to rotate (i) at a desired speed when the angular position of said shaft is within said selected interval, and (ii) at a substantially higher speed when the angular position of said shaft is outside said selected interval.

26. Apparatus for determining the viscosity of a liquid medium, comprising:
- a rotatable shaft having a fluid shearing spindle affixed thereto for immersion in said liquid medium;
- a drive motor for rotating said shaft;
- timing means for generating a sampling signal during a predetermined interval of angular position of said shaft;
- additional timing means for generating a motor speed control signal during a selected interval of angular position of said shaft, said selected interval including said predetermined interval;
- motor speed control means coupled to said additional timing means and responsive to said speed control signal for causing said motor to rotate (i) at a desired speed when the angular position of said shaft is within said selected interval, and (ii) at a substantially higher speed when the angular position of said shaft is outside said selected interval;
- measuring means for providing a signal corresponding to the torque applied to said spindle and the adjacent portion of said shaft due to viscous interaction with said liquid medium; and
- a sample and hold circuit coupled to said timing means and responsive to said sampling signal for rendering said measuring means operative only during periods when the angular position of said shaft is within said predetermined interval.

* * * * *